Nov. 11, 1947.　　　G. W. THELIN　　　2,430,746
WINDING MACHINE
Filed Sept. 4, 1945　　　4 Sheets-Sheet 1

INVENTOR.
George W. Thelin
BY Harold E. Cole
ATTORNEY.

Nov. 11, 1947. G. W. THELIN 2,430,746
WINDING MACHINE
Filed Sept. 4, 1945 4 Sheets-Sheet 2

INVENTOR.
George W. Thelin
BY Harold E. Cole
ATTORNEY.

Nov. 11, 1947.                G. W. THELIN                2,430,746
                              WINDING MACHINE
                           Filed Sept. 4, 1945            4 Sheets-Sheet 3
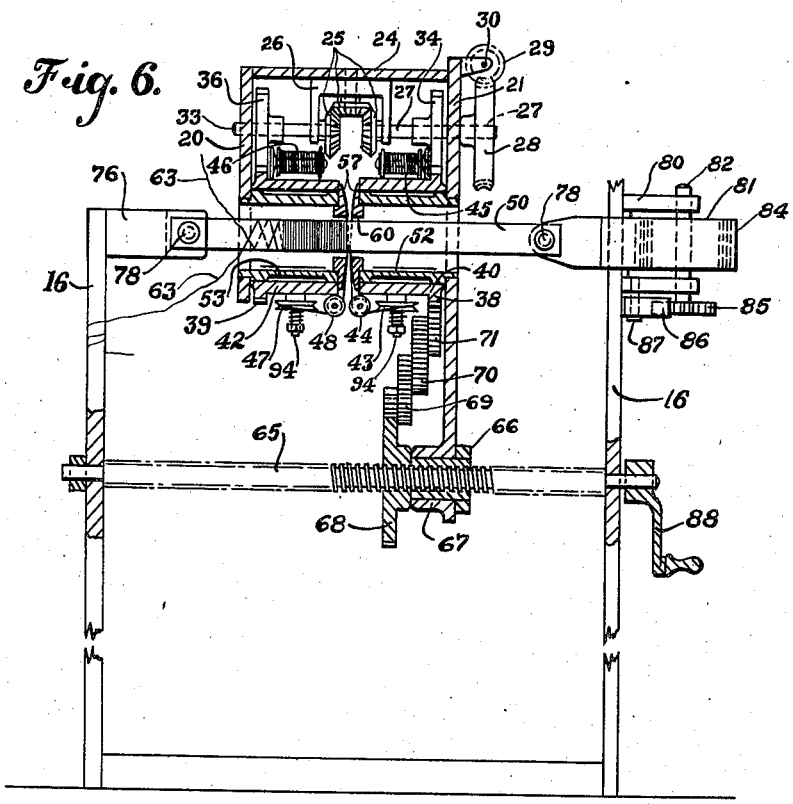
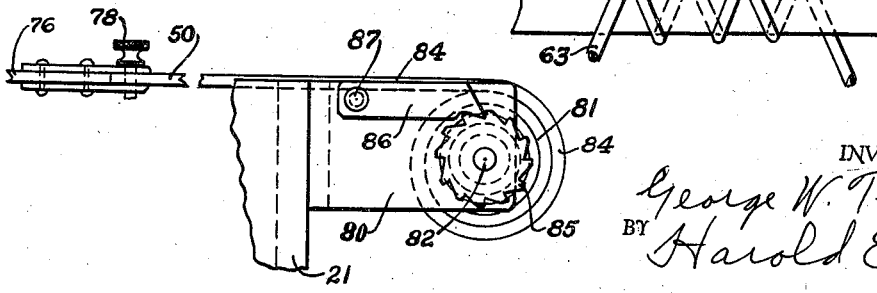
INVENTOR.
George W. Thelin
BY Harold E. Cole
ATTORNEY.

Nov. 11, 1947.       G. W. THELIN       2,430,746
WINDING MACHINE
Filed Sept. 4, 1945       4 Sheets-Sheet 4
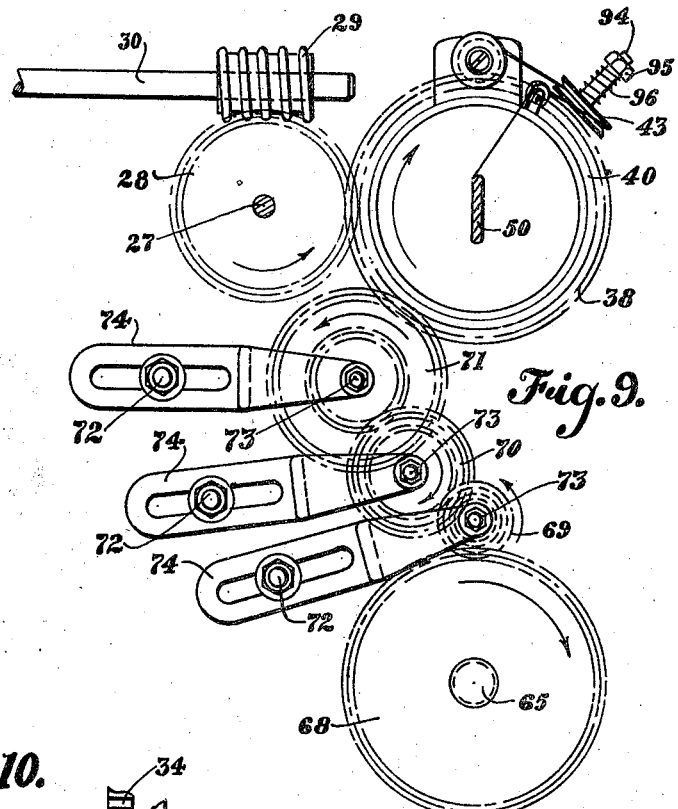
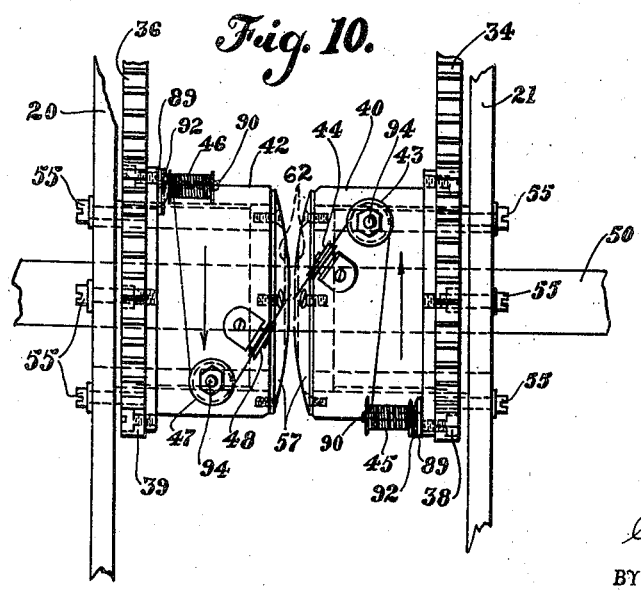
INVENTOR.
George W. Thelin
BY Harold E. Cole
ATTORNEY.

Patented Nov. 11, 1947

2,430,746

UNITED STATES PATENT OFFICE 2,430,746

WINDING MACHINE

George W. Thelin, Wellesley, Mass.

Application September 4, 1945, Serial No. 614,415

16 Claims. (Cl. 242—1)

This invention relates to a machine to wind wires.

The principal object of my invention is to provide a machine that, while under positive control automatically winds wires across each other onto a winding form or core. It is applicable to wind the Ayrton and Perry type winding of a non-inductive resistor having two windings—one progressive clockwise and the other progressive counter-clockwise, in alternating sequence.

Another object is to provide mechanism to cause the carriage, which supports the winding core, to automatically move or progress simultaneously and evenly with the winding.

Another object is to make provision between opposite ends of the rotors to permit two thicknesses of wire to pass where they cross each other and to permit only one thickness at other points.

Another object is to provide means to control the rate of travel of the carriage so that its speed may be varied to correspond with the thickness of wire to be wound, and for any other desired purpose.

The foregoing and other objects which will appear as the nature of the invention is better understood, may be accomplished by a construction, combination and operative arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

In the drawings:

Figure 6 is a graphic sectional view of my machine.

Figure 7 is a top plan diagrammatic view showing how the wire, in exaggeration, is wound around the core of my machine.

Figure 8 is a front elevational view of the tightening mechanism that holds one end of the core.

Figure 9 is an end elevational view of the driving mechanism of my machine.

Figure 10 is an enlarged top plan view of the rotor assembly.

Figure 1:
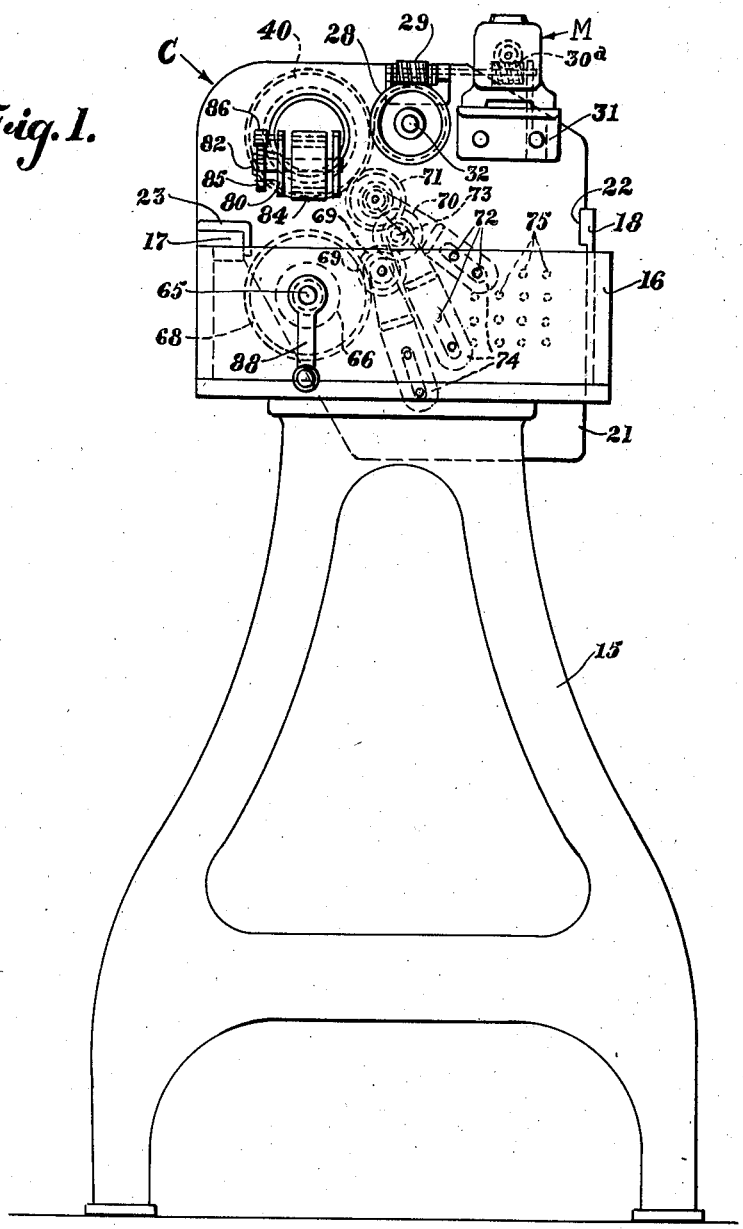
Figure 1 is an end elevational view of my winding machine.
Figure 2:
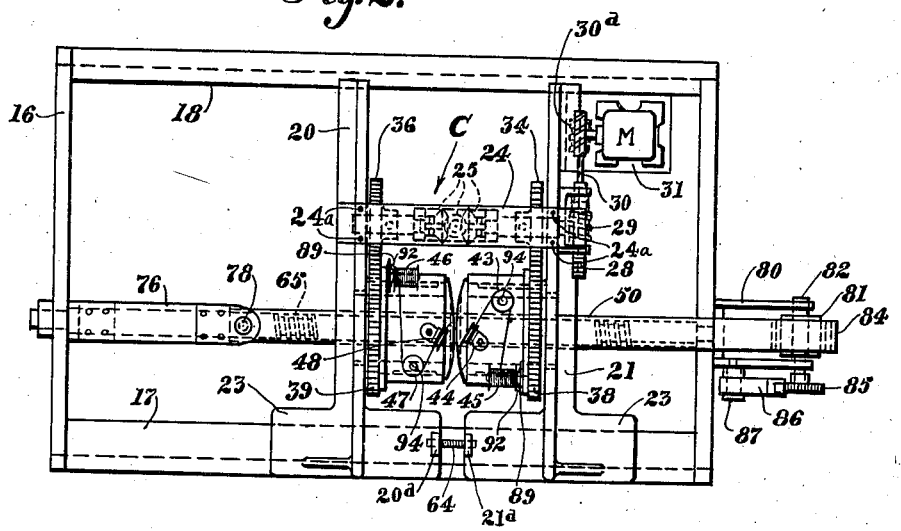
Figure 2 is a top plan view of said machine.
Figure 3:
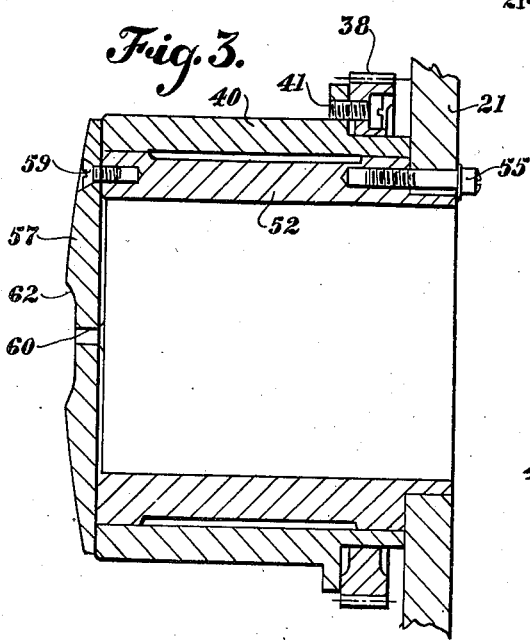
Figure 3 is an enlarged sectional view of a rotor assembly.
Figure 4:
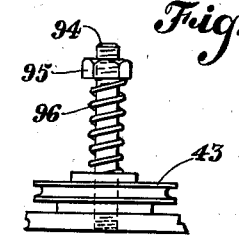
Figure 4 is an enlarged side elevational view of a guide pulley for the wire that is mounted on the rotor.
Figure 5:
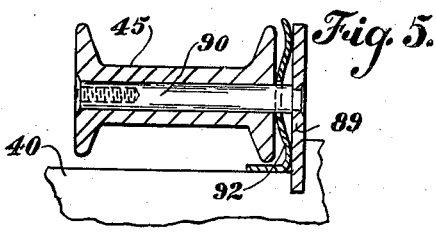
Figure 5 is an enlarged sectional view of the spool assembly which carries the supply of wire.

As illustrated, my winding machine has a main support or stand 15 on which a fixed supporting frame 16 is mounted, which frame has a stationary front guide strip 17 and a stationary rear guide strip 18 along which a carriage C moves when my machine is operating. Said carriage C includes two side supports 20 and 21 at opposite ends thereof having guide slotted portions 22 at their rear portions that ride along said guide strip 18, and guide members 23 at their front portions which ride along said guide strip 17.

A cross plate 24 is screwed, as at 24a, to said side supports 20 and 21. A combination of three miter gears 25, as shown in Figure 6 of the drawings, are mounted in a bracket 26 that is attached to said plate 24. Mounted in said side support 21 and bracket 26 is a miter gear shaft 27 having a worm gear 28 at its outer end which meshes with a worm 29 on a shaft 30 on the end of which shaft is a worm 30a that is driven by a motor M of the usual type mounted on a bracket 31 that is mounted on said side support 21.

Another miter gear shaft 33 is mounted in said side support 20 and bracket 26. Fixed to said miter gear shaft 27 is a gear 34 which drives a gear 38 which is attached to a rotor 40 by screws 41. On said miter gear shaft 33 is fixed a gear 36 which drives another gear 39 attached to a rotor 42. This gear 39 rotates in an opposite direction to said gear 38. Said rotor 40 carries a supply spool 45 on which a supply of wire is wound and two guide rolls 43 and 44 for said wire to position said wire and direct it between said rotors. This rotor 40 rotates in a direction opposite to that taken by rotor 42 thus giving the wire a cross twist as it winds around a core 50 as illustrated, in exaggeration, in Figure 7 of the drawings. The latter rotor 42 carries a wire supply spool 46 and two guide rolls 47 and 48. I have a flat core 50, but it could be round, square, oval or of other shape as desired. It extends through said rotors 40 and 42 as later explained.

Said rotor 40 rotates on a hollow bearing 52 secured to said side support 21 by screws 55, while said rotor 42 rotates on a bearing 53 secured to said side support 20. At the end of each said rotor 40 and 42 are end plates 57, somewhat convex shaped, which are secured to said bearings 52 and 53 by screws 59 to keep said rotors 40 and 42 from slipping off said bearings 52 and 53. Said end plates 57, which are close to but slightly spaced from each other each has a guide slot 60 through which said core 50 extends. One said slot 60 is of a size to barely accommodate said core 50, the other slot being larger to allow said core and wire to be withdrawn. Each said end plate 57 has a clearance groove 62 near the center to accommodate two wires 63 where they cross each other on said core 50. The space between said end plates 57 can be changed by a vernier adjusting screw 64 which screws into two bosses 20a and 21a. This is done by loosening said screws 24a to permit very slight movement of said sides 20 and 21 which the clearances in the holes for the screws 24a permit. Said wires 63 are close to or in actual contact with at least one of said end plates 57.

Extending between the two sides of said supporting frame 16 is a lead screw 65 on which said carriage C travels by means of a lead screw nut 66 which is mounted in a bearing 67 that is a part of said carriage side supports 21. A gear 68 is secured to said lead screw nut 66 and actuates it along said lead screw 65. Said gear 68 in turn is driven by intermediate gears 69, 70 and 71 respectively, the latter gear 71 being driven by said rotor gear 38.

Said intermediate gears 69, 70 and 71 are mounted on studs 73 fixed in brackets 74 which are fastened to said side support 21 by bolts 72 which pass through holes 75 provided in said side support 21, of which there are many to permit any positioning of different combinations of said gears 69, 70 and 71 desired, as different sizes of wires are used or spaces provided in the winding are varied.

A flexible strap 76 is attached to said frame 16 and said core 50 is fastened thereto by a pin 78. A bracket 80 is attached to said frame 16 on which is mounted a take-up roll 81 on a pin 82 extending into said bracket 80. Around said roll 81 a flexible strap 84 is wound similarly to said strap 76, and to which strap 84 the other end of said core is fastened, which strap 84 can be pulled tightly by a ratchet 85 to which said pin 82 is attached. A ratchet pawl 86 holds said ratchet 85 in any desired position, being mounted on said bracket 80 by stud 87.

A handle 88 on the end of the lead screw 65 will, upon rotation, move said carriage in either direction.

Said wires 63 are attached at their free or outer ends to said frame 16 or any stationary object.

To make intermittent groups of winding on the same core 60 the machine carriage is stopped and said handle 88 is rotated until the carriage is moved the desired distance to space one winding from another. The wires could be continuous in intermittent winding if desired. A single winding only, wound in either direction, could likewise be made with my machine, having any spacing desired.

What I claim is:

1. A winding machine comprising two rotor assemblies the rotors of which are adapted to rotate in opposite directions, means to cause said rotors to so rotate, said rotors each embodying instrumentalities to hold a supply of wire, a movable carriage supporting said rotor assemblies, supporting means for said carriage, and holding means supported by said supporting means adapted to hold a core to wind said wire thereon.

2. A winding machine comprising two rotor assemblies the rotors of which are adapted to rotate in opposite directions, said assemblies each having an opening intermediate the peripheral surfaces of said rotors around which a core to wind wire on may pass, means to cause said rotors to so rotate, said rotors each embodying instrumentalities to hold a supply of wire, a movable carriage supporting said rotor assemblies and means, and supporting means for said carriage.

3. A winding machine comprising two rotor assemblies the rotors of which are adapted to rotate in opposite directions and each having an opening therein through which a core to wind wire on may pass, a movable carriage supporting said rotor assemblies, means to cause said rotors to so rotate, said rotors each embodying instrumentalities to hold a supply of wire, and supporting means for the aforesaid elements.

4. A winding machine comprising two rotor assemblies, the rotors of which are adapted to rotate in opposite directions, a movable carriage supporting said assemblies, means to cause said rotors to so rotate, said rotors each embodying instrumentalities to hold a supply of wire, holding means embodying tightening mechanism adapted to hold a core to wind said wire thereon, and supporting means for the aforesaid elements.

5. A winding machine comprising two rotor assemblies the rotors of which are adapted to rotate in opposite directions, a movable carriage supporting said assemblies, means to cause said rotors to so rotate, said rotors each embodying instrumentalities to hold a supply of wire and embodying guide means to position said wire when unwound, holding means adapted to hold a core to wind said wire thereon, and supporting means for the aforesaid elements.

6. A winding machine comprising two rotor assemblies, the rotors of which are adapted to rotate in opposite directions, means to cause said rotors to so rotate, said rotors each embodying instrumentalities to hold a supply of wire, and each embodying an end plate which is adjacent the other, a movable carriage supporting said rotor assemblies and means, supporting means for said elements, and holding means supported by said supporting means adapted to hold a core to wind said wire thereon.

7. A winding machine comprising two rotor assemblies the rotors of which are adapted to rotate in opposite directions, means to cause said rotors to so rotate, said rotors each embodying instrumentalities to hold a supply of wire and each embodying an end plate which is adjacent the other and each embodying guide means to position said wire when unwound so it passes between said end plates, supporting means for the aforesaid elements, and holding means supported by said supporting means adapted to hold a core to wind said wire thereon.

8. A winding machine comprising two rotor assemblies the rotors of which are adapted to rotate in opposite directions, means to cause said rotors to so rotate, said rotors each embodying instrumentalities to hold a supply of wire and each embodying an end plate which is adjacent the other and the outer surfaces of which are convex shaped, and each embodying guide means to position said wire when unwound so it passes between said end plates, said end plates each having a groove therein to thereby permit two thicknesses of wire to pass between them, supporting means for the aforesaid elements, and holding means supported by said supporting means adapted to hold a core to wind said wire thereon.

9. A winding machine comprising two rotor assemblies the rotors of which are adapted to rotate in opposite directions and each having an opening therein through which a core may pass, a movable carriage supporting said rotor assemblies, means to cause said rotors to so rotate, said rotors each embodying instrumentalities to hold a supply of wire, instrumentalities operatively connected to said means to thereby actuate said carriage, and supporting means for the aforesaid elements.

10. A winding machine comprising two rotor assemblies, the rotors of which are adapted to rotate in opposite directions, means to so rotate said rotors, said rotors each embodying instrumentalities to hold a supply of wire and each embodying an end plate which is adjacent the other and spaced apart sufficiently to permit one thickness of said wire to pass between them and at one point to permit two thicknesses of said wire to pass between them, a movable carriage supporting said rotor assemblies, and supporting means for said elements.

11. A winding machine comprising two rotor assemblies, the rotors of which are adapted to rotate in opposite directions, means to so rotate said rotors, said rotors each embodying instrumentalities to hold a supply of wire and each embodying a convex-shaped end plate which is adjacent the other and spaced apart sufficiently to permit one thickness and less than two thicknesses of said wire to pass between them and at an intermediate point to permit two thicknesses of said wire to pass between them, a movable carriage supporting said rotor assemblies and means, supporting means for said elements, and holding means supported by said supporting means adapted to hold a core to wind said wire thereon.

12. A winding machine comprising two rotor assemblies, the rotors of which are adapted to rotate in opposite directions, means to so rotate said rotors, said rotors each embodying instrumentalities to hold a supply of wire and each embodying an end plate which is adjacent the other and spaced apart sufficiently to permit a thickness of said wire to pass between them and at one point to permit two thicknesses of said wire to pass between them, means to adjust the spacing between said end plates, a movable carriage supporting said rotor assemblies supporting means for said elements, and holding means supported by said supporting means adapted to hold a core to wind said wire thereon.

13. A winding machine comprising two rotor assemblies the rotors of which are adapted to rotate in opposite directions, said assemblies each embodying a bearing on which said rotor rotates and having an opening therein to permit passage of a core to wind wire on and embodying an end plate for each rotor which end plates are adjacent each other and spaced apart sufficiently to permit one thickness of wire to pass between them and at one point to permit two thicknesses of wire to pass between them, said end plates each having an opening therein to permit a said core to pass therethrough, means to cause said rotors to so rotate, a movable carriage supporting said rotor assemblies, means by which said carriage travels, instrumentalities operatively connecting said first-mentioned means to said latter mentioned means embodying intermediate gears whereby the travel of said carriage may be made synchronous with the winding of the wire upon said core, and fixed supporting means for the aforesaid elements.

14. A winding machine comprising two rotor assemblies the rotors of which are adapted to rotate in opposite directions, said assemblies each embodying a bearing on which a said rotor rotates and having an opening therein to permit passage of a core to wind wire on and embodying an end plate for each rotor which end plates are adjacent each other and spaced apart sufficient to permit one thickness of wire to pass between them and at one point to permit two thicknesses of wire to pass between them, said end plates each having an opening therein to permit a said core to pass therethrough, means to cause said rotors to so rotate, a movable carriage supporting said rotor assemblies, means by which said carriage travels, instrumentalities operatively connecting said first-mentioned means to said latter mentioned means embodying intermediate gears whereby the travel of said carriage may be made synchronous with the winding of the wire upon said core, fixed supporting means for the aforesaid elements, and means attached to said supporting means to attach said core to.

15. A winding machine comprising two rotor assemblies the rotors of which are adapted to rotate in opposite directions, said assemblies, each embodying a hollow bearing on which a said rotor rotates and an end plate for each rotor which end plates are adjacent each other and spaced apart sufficiently to permit one thickness of wire to pass between them and at one point to permit two thicknesses of wire to pass between them, said end plates each having an opening therein to permit a core to wind wire on to pass therethrough, means to cause said rotors to so rotate, a movable carriage supporting said rotor assemblies, means by which said carriage travels, and instrumentalities operatively connecting said first-mentioned means to said latter mentioned means embodying intermediate gears whereby the travel of said carriage may be made synchronous with the winding of the wire upon said core, fixed supporting means for the aforesaid elements, said carriage means embodying a lead screw attached to said supporting means, a lead screw nut movable thereon and means connecting said nut to said carriage, and means attached to said supporting means to attach said core to.

16. A winding machine comprising two rotor assemblies the rotors of which are adapted to rotate in opposite directions, said assemblies each embodying a bearing on which a said rotor rotates having an opening therein to permit passage of a core to wind wire on and embodying an end plate for each rotor which end plates are adjacent each other and spaced apart sufficiently to permit one thickness of wire to pass between them and at one point to permit two thicknesses of wire to pass between them, said end plates each having an opening therein to permit a said core to pass therethrough, each said rotor embodying a spool for a supply of said wire and two guide rolls so positioned that said wire will travel from said spool to the space between said end plates, means to cause said rotors to so rotate, a movable carriage supporting said rotor assemblies, means by which said carriage travels, instrumentalities operatively connecting said first-mentioned means to said latter mentioned means embodying a plurality of gears whereby the travel of said carriage may be made synchronous with the winding of the wire upon said core, supporting means for the aforesaid elements, and means attached to said supporting means to which said core may be attached and held tight.

GEORGE W. THELIN.